United States Patent
Dehu et al.

(10) Patent No.: US 6,592,074 B2
(45) Date of Patent: Jul. 15, 2003

(54) SYSTEM DRIVING THE DISPLACEABLE FAIRING OF A TURBOJET-ENGINE THRUST REVERSER

(75) Inventors: Michel Philippe Dehu, Sainte Adresse (FR); Damien Benoît Marie Lesbos, Le Havre (FR); Guy Bernard Vauchel, Le Havre (FR)

(73) Assignee: Hurel-Hispano, Le Havre (FR)

( * ) Notice: Subject to any disclaimer, the term of this patent is extended or adjusted under 35 U.S.C. 154(b) by 0 days.

(21) Appl. No.: 10/092,881

(22) Filed: Mar. 8, 2002

(65) Prior Publication Data
US 2002/0125370 A1 Sep. 12, 2002

(30) Foreign Application Priority Data
Mar. 8, 2001 (FR) .............................. 01 03135

(51) Int. Cl.[7] ................................ F02K 1/62
(52) U.S. Cl. ................................ 244/110 B
(58) Field of Search ................ 244/110 B; 239/265.23, 239/265.19, 265.25, 265.33, 265.31, 265.29

(56) References Cited

U.S. PATENT DOCUMENTS

| 4,137,711 | A |   | 2/1979 | Montgomery |
|---|---|---|---|---|
| 4,147,028 | A |   | 4/1979 | Rodgers |
| 4,278,220 | A |   | 7/1981 | Johnston et al. |
| 4,407,120 | A |   | 10/1983 | Timms |
| 4,442,987 | A |   | 4/1984 | Legrand et al. |
| 4,519,561 | A |   | 5/1985 | Timms |
| 4,527,391 | A | * | 7/1985 | Marx et al. ................. 60/226.2 |
| 5,778,659 | A | * | 7/1998 | Duesler et al. ............. 60/226.1 |
| 5,794,434 | A | * | 8/1998 | Szupkay ..................... 60/226.2 |
| 5,806,302 | A | * | 9/1998 | Cariola et al. ................ 60/204 |
| 5,996,937 | A |   | 12/1999 | Gonidec et al. |
| 6,000,216 | A | * | 12/1999 | Vauchel ..................... 60/226.2 |
| 6,170,254 | B1 | * | 1/2001 | Cariola ....................... 60/226.2 |
| 6,385,964 | B2 | * | 5/2002 | Jean et al. .................. 60/226.2 |
| 6,434,927 | B1 | * | 8/2002 | Stretton ...................... 60/226.2 |

FOREIGN PATENT DOCUMENTS

| EP | 0109219 |   | 5/1984 |   |
|---|---|---|---|---|
| EP | 109219 | A2 * | 5/1984 | ............ F02K/1/62 |
| EP | 0852290 |   | 8/1998 |   |
| GB | 1386232 |   | 3/1975 |   |

* cited by examiner

Primary Examiner—Michael J. Carone
Assistant Examiner—Timothy D Collins
(74) Attorney, Agent, or Firm—Bacon & Thomas, PLLC

(57) ABSTRACT

A thrust reverser having an annular duct bounding a bypass flow and including a set of vane cascades configured in a stationary pod portion, a displaceable fairing slidably mounted on the stationary pod portion to permit sliding motion along a slotted cylindrical shell and to be translated between a stowed position blocking access of the bypass flow to the vane cascades and a deployed position wherein the vane-cascades are exposed to the bypass flow, a drive system driving the displaceable fairing, and flaps arranged to seal the annular duct in order to deflect a flow toward the vane cascades. The drive system further includes linear actuators substantially configured in the central axis of the slotted cylindrical shells.

9 Claims, 5 Drawing Sheets

SYSTEM DRIVING THE DISPLACEABLE FAIRING OF A TURBOJET-ENGINE THRUST REVERSER

BACKGROUND OF THE INVENTION

The invention relates to thrust reversers for aircraft turbojet engines. In particular, the invention relates to an aircraft thrust-reverser turbojet-engine having an external pod which combines with an internal stationary structure to define an annular duct through which circulates a bypass flow. The thrust reverser includes vane cascades in the pod and at least one displaceable fairing mounted on the pod in a manner to be displaceable along a plurality of guides. The fairing is movable between a stowed position wherein it blocks access to the vanes and a deployed position wherein the vanes are exposed. Drive devices are provided to drive the displaceable fairing relative to the pod and flaps are arranged to seal the annular duct when the displaceable fairing is in the deployed position in order to deflect the bypass flow towards the vane cascades.

When the turbojet engine operates in a forward thrust mode, the displaceable fairing constitutes all or part of the pod's downstream end, the flaps in this case being housed within the displaceable fairing which seals off the bypass flow from the vane cascades. The displaceable fairing is arranged to be axially moved rearward by a control system illustratively comprising linear actuators affixed upstream of the vane cascades. Rearward motion of the displaceable fairing urges the plurality of flaps to pivot and thereby seal the duct to deviate the bypass flow through the duct towards the vane cascades configured along outer periphery of the duct. The vane cascades are therefore only accessible when the displaceable fairing is in the deployed position.

In known embodiments of such turbojet-engine thrust reversers, each comprising a semi-cylindrical segments of the displaceable fairing is connected to a displacement drive means illustratively comprising two linear actuators. The flaps are pivoted, for example, by linkrods connected to a fixed linkrod pivot positioned along the inside wall of the bypass duct.

European patent document 9 109 219 A discloses illustrative embodiments of such thrust reversers. FIGS. 1 and 2 schematically show the configurations of the thrust-reverser components as described in European patent document 9 109 219 A.

The pod 1 enclosing the bypass flow from the fan and the inner engine stationary structure 2 combine to subtend an annular duct 3 through which passes the bypass flow F2. The pod 1 and the stationary inner structure 2 are supported by a pylon 4 underneath the aircraft's wing. The pod 1 comprises an upstream portion terminating downstream into a rigid framework 5, and further comprises along a downstream side thereof a displaceable fairing 6 consisting of two semi-cylinders 6a, 6b, each bounded by an inner wall 7 bounding in turn the cold flow F2, and an external wall 8 implementing the displaceable streamlined contour of the pod 1. The two walls 7, 8 diverge in the upstream direction to define therebetween an annular duct 9 fitted with a set of cascaded vanes firmly affixed to the framework 2. Linear actuators 10a, 10b are provided to implement the axial displacements of the semi-cylinders 6a and 6b. Flaps 11 hinge upstream on the inner wall 7 and downstream on linkrods 12, the linkrods in turn hinging on the inner structure 2. The flaps 11 are housed within the semi-cylinders 6a, 6b when positioned close to the framework 5. When the displaceable fairing 6 assumes this upstream position in the stowed position, the vane cascades are enclosed within the space 9.

When the linear actuators 10a, 10b extend axially, the fairing 6 translates downstream and the vane cascades are exposed to the bypass flow. The linkrods 12 pivot on their pivots 13 and the flaps 11 move to block the annular duct 3 downstream from the vane cascades. The bypass flow F2 is deflected toward the van cascades which in turn deflect the flow F2 to the front of, and outside of the pod.

The semi-cylinders 6a, 6b are mounted in a sliding manner in guides 14a, 14b, 14c, 14d positioned near the pylon 4 and near a spacer 15 which is diametrically opposite the pylon 4. The pylon 4, the spacer 15 and the framework 5 are firmly affixed to the stationary inner structure 2.

In the described thrust reverser, the guides 14a, 14b, 14c, 14d operate in at least three basic modes. The first mode allows engaging the structures of the displaceable fairing 6. The second mode is to guide the displaceable fairing 6 in a direction parallel to the engine axis when the displaceable fairing is moved. The third mode is to resist the aerodynamic stresses applied to the structure of the displaceable fairing 6 that tend to separate the structure from the inner structure 2 enclosing the engine. Two stresses are applied to the displaceable fairing 6, namely one longitudinal and the other radial. These stresses are absorbed in guide elements 14a, 14b, 14c, 14d configured at each radially upper and lower end of the stationary structure 2.

Illustratively, there are two linear actuators 10a, 10b for each half of the displaceable fairing 6a, 6b. It should be noted that there may be additional actuators used in the thrust reverser system. The linear actuators serve at least three basic functions in this type of thrust reverser. The first function is to drive the displaceable fairing 6. The second function is to transmit, at least partly, the stresses applied to the displaceably fairing 6 by means of the framework 5 to the upstream stationary structure of the pod 1. The third function is to provide a safer locking system for the structure.

Each linear actuator 10a, 10b is configured a distance L away from the nearest guide element 14a, 14b, 14c, 14d. This distance L entails torque generating stray forces in the stationary structure 2 and in the displaceable fairing 6a, 6b. To remedy this problem, the guide elements 14a, 14b, 14c, 14d may be extended. This design would generally require structural elements that protrude outside the streamlines of the pod 1. One might also structurally reinforce the guide elements by increasing their cross-sections. Such a solution however would entail an increase in weight. Highly accurate synchronization between the linear actuators 10a, 10b might partly compensate the problem, but such remedies entail two substantial drawbacks; the first one being a drop in thrust-reverser reliability and the second one being an increase in weight.

Additional drawbacks are incurred on account of configuring the linear actuators 10a, 10b in the zones of the annular space 9 which are between the pylon 4 and the spacer 15, the zones being covered by those vane cascades deflecting the flow F2 that are near the front of the pod 1. The bypass flow F2 through the pod 1 therefore is partly blocked by the linear actuators 10a, 10b. This loss of cross-section therefore must be compensated by a greater axial length of the set of vane cascades, whereby retraction of the displaceable fairing 6 is affected. The cases of the linear actuators 10a, 10b are subjected to buckling stresses from the reverse flow F2. As a result, the cross-section of the structure of the linear actuators 10a, 10b must be increased, with an attending increase in weight. During thrust reversal of the turbojet-engine, the drive rod of the linear actuators is positioned within the flow F2 and therefore subjected to pollution which must be counteracted using a sophisticated sealing system. The exposure of the drive rod to the bypass flow affects linear-actuator weight and reliability. Moreover, in configuring the size of the vane cascades, the obstruction represented by the linear actuators in order to compensate the lost radial reversal cross-section must be taken into account. As a result, it is difficult to use identical vane cascades and their manufacture is more costly. Lastly, the increase in friction between the guide elements caused by the torque requires a structurally reinforced framework.

SUMMARY OF THE INVENTION

The first objective of the present invention is to create a thrust reverser of the above cited type wherein the torque applied to the straight guide elements is reduced, or even eliminated when the drive means of the displaceable fairing are operational.

Another objective of the invention is to configure the linear actuator and the guide elements in a manner to lower the thrust-reverser weight.

The invention attains these objectives in that the means driving the displaceable-fairing are substantially configured along the center axis of the slotted cylindrical shells.

In this manner, the design of the invention eliminates the undesirable torque. Advantageously, the slotted cylindrical shells comprise an outer wall which is firmly joined to a stationary pod structure housing in sliding manner through an elongated body, hereafter cylinder, which is firmly affixed to the displaceable fairing. The cylinder is fitted with elements cooperating with associated drive elements. The outer wall in this manner protects the cylinder displacement means from the reverse flow, in particular against buckling and pollution.

In a first embodiment, the associated drive elements include a linear control actuator.

This linear control actuator is configured with a screw rotationally driven by a kinematics element cooperating with an inside thread in the cylinder.

In one embodiment variation, the screw is configured at the end of a rod.

In another embodiment variation, an internal thread of the cylinder includes a swiveling nut fastened to the cylinder.

The linear control actuator also may be fitted with a screw firmly affixed to the cylinder and driven into translation by a kinetics unit.

In a second embodiment of the invention, the associated displacement drive elements include a kinematic element driving a gear that meshes with teeth on one side of the cylinder.

Preferably the pod and the inner structure rest on a strut, at least one guide being configured on either side of the strut.

Advantageously, the thrust reverser includes two reverser segments configured one on each side of the strut, whereby each reverser segment cooperates with one of two diametrically opposite guides defined along sides of the struts. These guides rest on the stationary structure of the turbojet-engine in diametrically opposite zones and cooperate with the rims of respective reverser semi-cylindrical segments situated at the ends of the vane-cascade fitted zones. In this manner, the linear actuators are configured outside the vane cascades and also are free from the stresses generated by the reverse flow and pollution. Consequently the reliability of the thrust-reverser assembly is greatly enhanced.

Other advantages and features of the invention are elucidated in the illustrative description below and in relation to the attached drawings.

DETAILED DESCRIPTION OF THE PRESENT INVENTION

Figure 4:
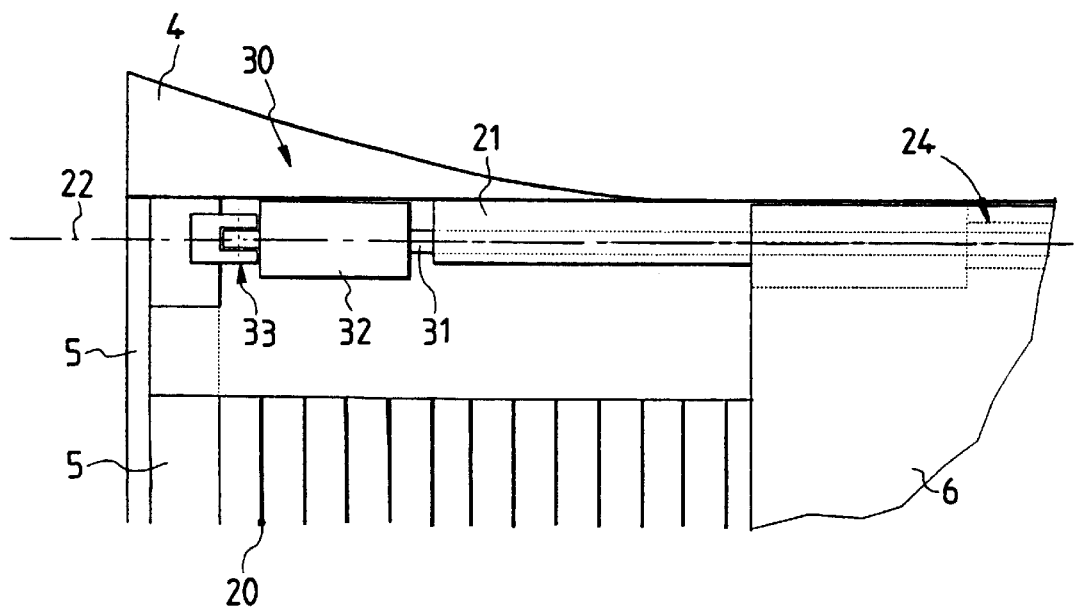
FIG. 4 is a topview along the arrow IV of FIG. 3 of the front of the thrust reverser of the invention in the deployed position.
Figure 5:
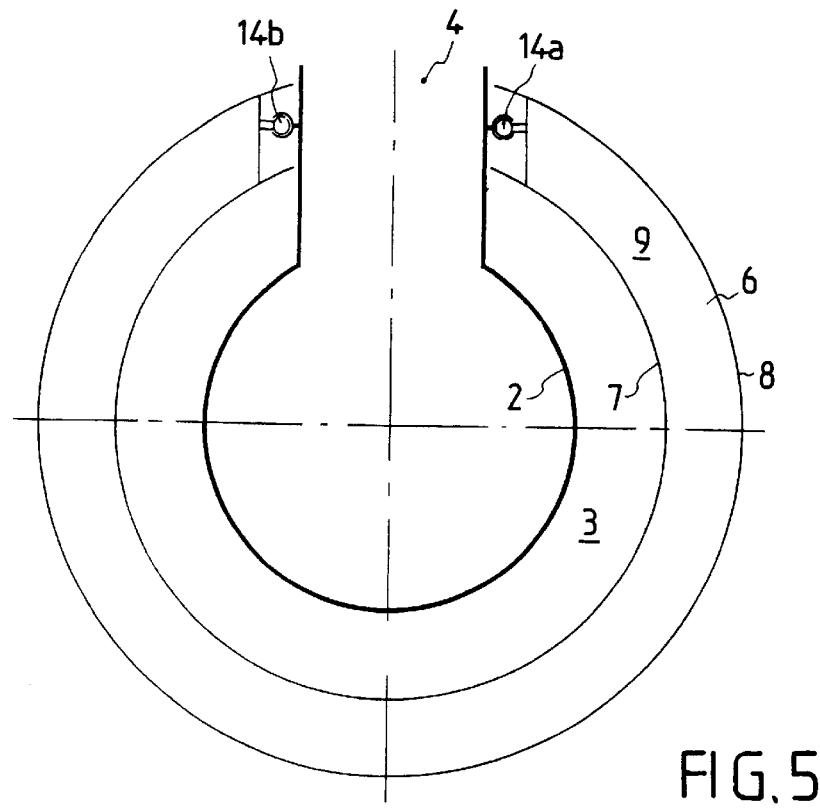
FIG. 5 is a front view of the thrust reverser showing a first configuration of the guide elements and of the axial drive elements for the displaceable fairing.
Figure 6:
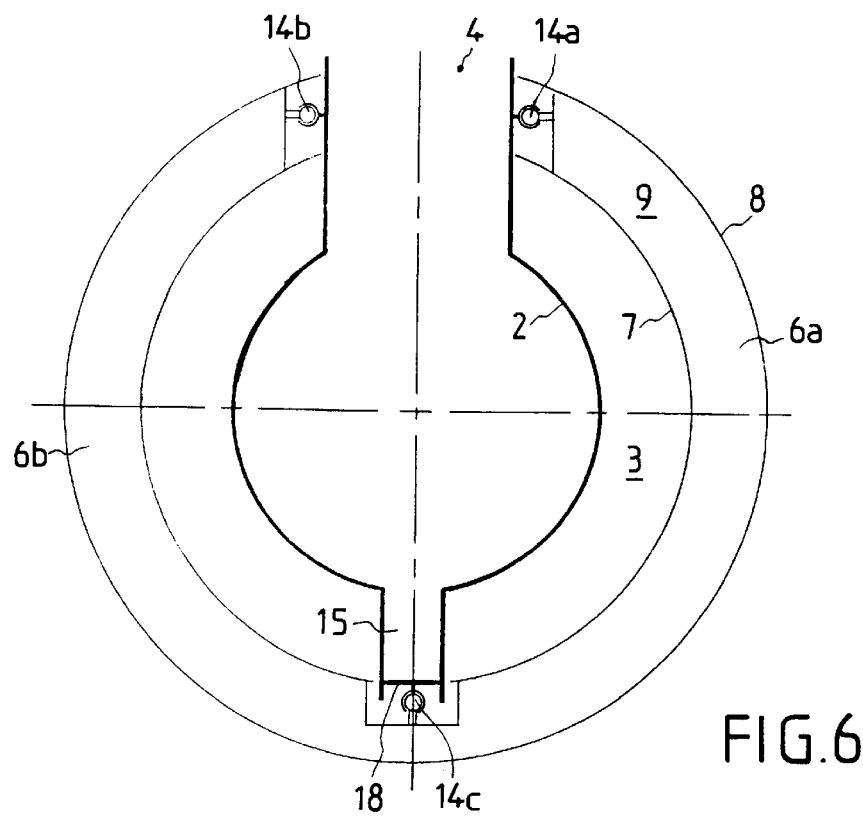
FIG. 6 is similar to FIG. 5 and shows a second configuration of the guide elements and of the axial drive elements for the displaceable fairing.

FIGS. 5 and 6 show a front view of a thrust reverser comprising an axially displaceable fairing 6 consisting of an inner hoop 7 and an outer hoop 8 subtending between them a space 9 containing a set of vane cascades 20 (FIG. 4). Together with an inner structure 2 enclosing the engine, the inner hoop 7 bounds an annular duct 3 through which, in the turbojet-engine thrust reversal mode, passes the bypass flow F2. The inner structure 2 is connected to an aircraft wing by a strut 4 which also supports the stationary pod enclosing the fan.

In the embodiment mode shown in FIG. 5, the displaceable fairing 6 is positioned on the strut 4 by two guides 14a, 14b configured on either side of the strut.

Regarding the embodiment of FIG. 6, the displaceable fairing 6 consists of two semi-cylindrical segments 6a, 6b. The strut 4 is positioned along the stationery structure 2 and defines along each side thereof one of the guides 14a, 14b. The thrust reverser further includes a spacer 15 positioned along the stationary structure 2 substantially diametrically opposite to the strut 4. The two semi-cylindrical segments 6a, 6b are mounted along opposite sides of the strut in cooperation with guides 14a and 14b. Each of the two fairings are also mounted along opposite sides of the spacer 15 in cooperation with guides 14c defined along opposites sides thereof.

Figure 1:
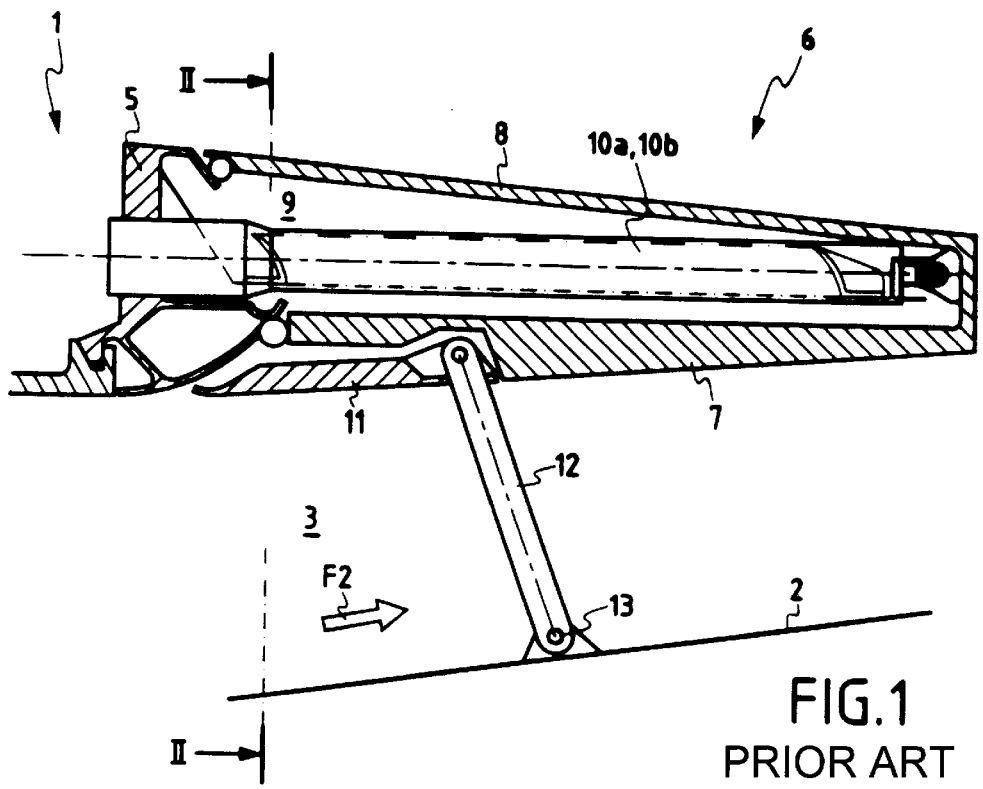
FIG. 1 is a cross-section part view, in a plane through the axis of rotation of a turbojet engine of a vane-cascade thrust reverser of the prior art in a stowed position.
Figure 2:
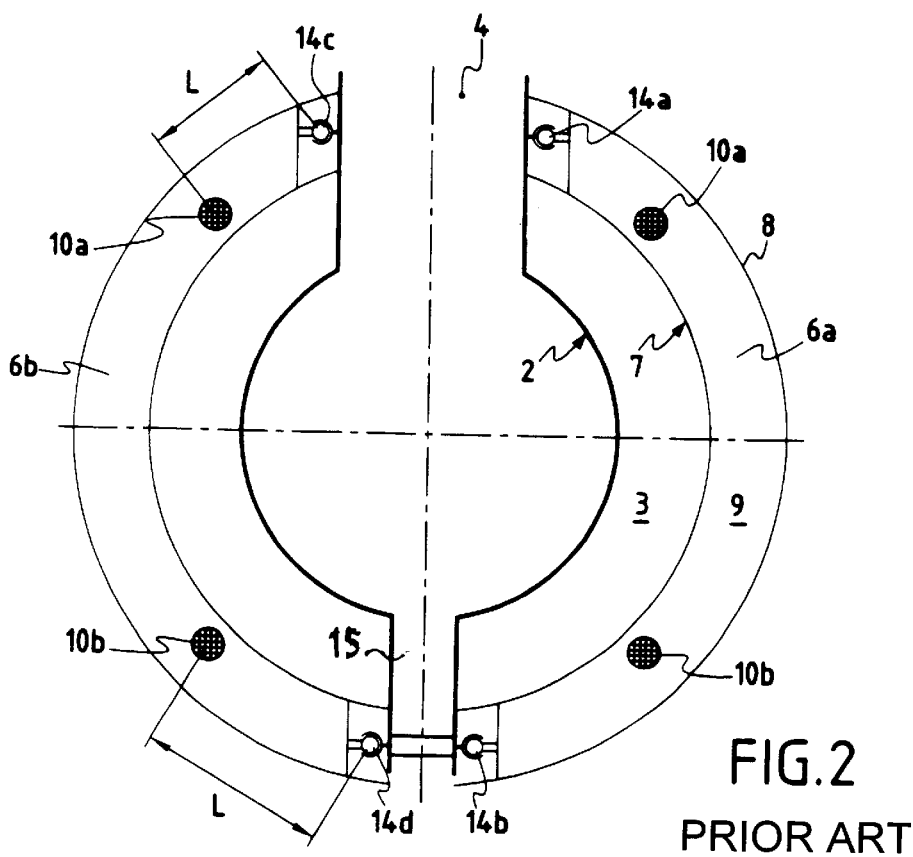
FIG. 2 is a schematic cross section in the region along line II—II of FIG. 1 showing the configuration of the guide elements and of the axial drive elements of the displaceable fairing of the prior art.

Advantageously, the two segments 6a, 6b are held on the spacer 15 by a single support 18 affixed to the spacer 15 in order to save assembly weight. Nevertheless, the two segments 6a, 6b obviously also may be each held on the strut 4 and the spacer 15 by two independent and substantially diametrically opposite guides 14a, 14b as shown in FIG. 2.

Figure 3:
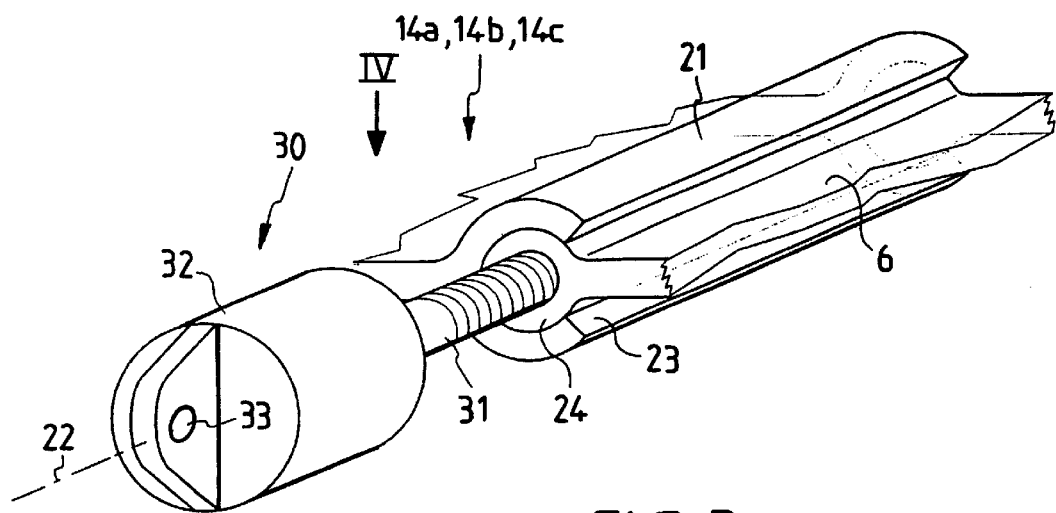
FIG. 3 is a perspective view of a guide element associated with an axial drive element of a first embodiment of the invention.

In FIG. 3, the guides 14a, 14b, 14c, and where applicable 14d, assume the shape of a slotted cylindrical shell 21 having an axis 22 parallel to that of the turbojet engine and comprising a lateral slot 23. This slotted cylindrical shell 21 runs at least along the full axial length of the vane cascades 20.

A cylinder 24 at the ends of the displaceable fairing 6 or of the semi-cylindrical segments 6a, 6b is housed in each of the slotted cylindrical shells 21.

The displaceable fairing 6 is axially driven by linear control actuators 30 anchored on the framework 5 by swivel ends 33, with actuator rods 31 acting synchronously with the cylinder 24.

Regarding the embodiment of FIG. 3, the rod 31 is threaded and driven into rotation by a kinematics element 32. The rod 31 comprises an axis 22 and cooperates with an internal thread in the cylinder 24. The kinematics element 32 may be pneumatic, electrical or hydraulic. Depending on application, the moving parts may be balls, rollers or guide elements.

It is understood that rotating the screw 31 directly drives the cylinder 24 inside the slotted cylindrical shell 21 which connects to the stationary thrust reverser structure in a direction parallel to the axis of the turbojet engine. The use of such a linear actuator 30 saves weight and improves the reliability of the assembly. Indeed, the cylinder 24 in general is among the components required for translation. By directly using the cylinder 24 as the motion-transmitting component, this allows for eliminating a joint of intermediate parts between the linear actuator 30 and the displaceable fairing 6 thereby reducing weight. As a result, fewer driving parts are required, malfunctions will be less likely, and thus reliability is enhanced.

The drive by the kinematics element 30 may be directly as shown in FIG. 3 or indirectly in the manner of a universal joint. In the event each actuator rod 31 is driven into rotation by its own control kinematics element, the latter will be synchronized.

FIG. 4 shows in comprehensive manner that the guides 14a, 14b, 14c and the associated linear actuators 30 are axially configured near the strut 4 or near an element which is firmly joined to the stationary inner structure 2 outside the surface covered by the vane cascades 20. In this manner, the drive elements of the displaceable fairing 6 are situated outside the reverse flow. The rods 31 of the linear actuators 30 moreover are housed within the cylinders 24 which in turn are protected inside the slotted cylindrical shells 21. The actuators are exposed neither to buckling nor to pollution.

Figure 8:
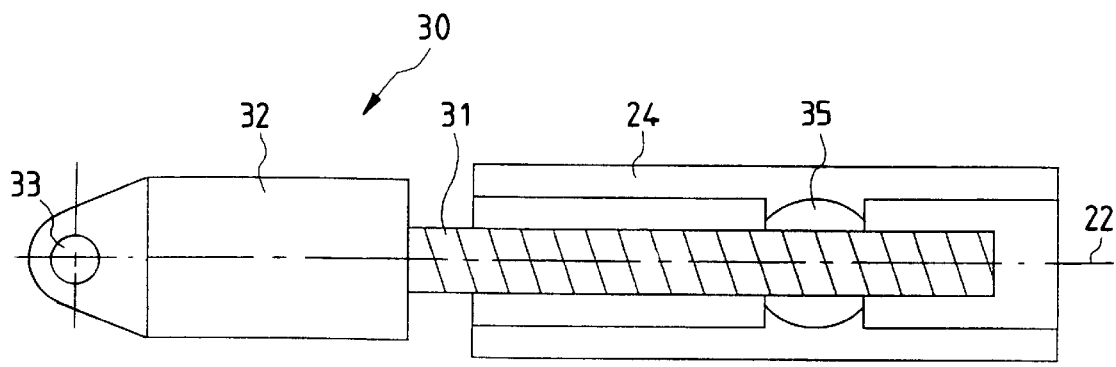
FIG. 8 is a cross-sectional view of a variation of the first embodiment mode to reset the control screw.

FIG. 8 shows a variation in driving the cylinder 24 by means of the threaded rod 31 of the linear actuator 30, whereby the trueing of the drive relative to the guide axis 22 can be restored. A nut swivel 35 fastened in the cylinder 24 is mounted inside a cavity of the cylinder 24.

Figure 9:
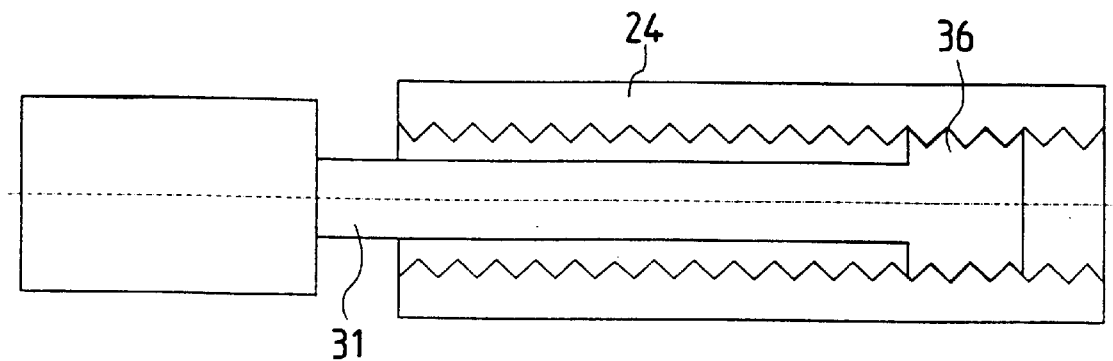
FIG. 9 is a cross-sectional view of another embodiment mode of the axial drive elements allowing minimizing buckling the control screw.

As regards the embodiment of FIG. 9, the cylinder 24 is fitted with an inside thread cooperating with a screw 36 that is solidly joined to the end of the rod 31 and driven into rotation by the kinematics element 32. This design counteracts buckling the rod 31 on account of the speed of rotation that would interfere with the design geometry of the rod 31.

Figure 10:
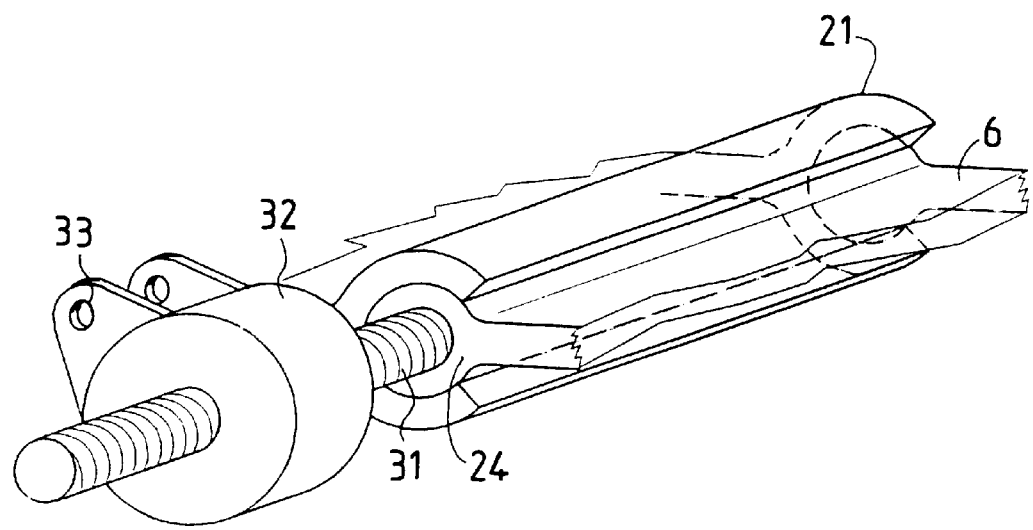
FIG. 10 is a perspective view of another configuration of the drive screw.

To mitigate the buckling problem of the rod 31 caused by its speed of rotation, another approach consists in linking the rod 31 to the cylinder 24. This design solution is shown in FIG. 10. In this case the rod 31 is driven into translation parallel to the turbojet-engine axis by the kinematics element 32.

Figure 7:
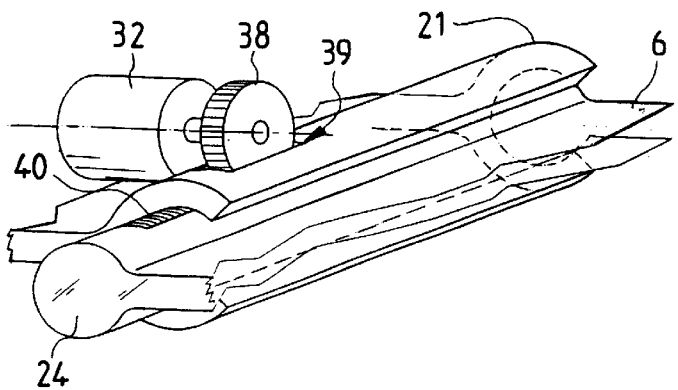
FIG. 7 is a front perspective view of a guide element associated with an axial drive element of a second embodiment of the invention.

FIG. 7 shows another illustrative means to axially drive the cylinder 24 relative to the slotted cylindrical shell 21. The kinematics element 32 drives into rotation a gear 38 which passes in part through an aperture in the wall of the slotted cylindrical shell 21 and meshes with a toothed rack fitted into the wall of the near-near-cylindrical shell 21. This rack-and-gear is configured as close as possible to the axis 22 of the slotted cylindrical shell 21. It should be noted that the toothed rack 40 may be may be configured on the flat end of the cylinder 24 near the slot 23 of the slotted cylindrical shell 21.

It will of course be appreciated that the invention is not confined to the particular embodiment described herein, but is intended to embrace all possible variations which might be made to it without departing from either the scope or spirit of the invention.

What is claimed is:

1. A thrust reverser of a turbojet engine having a stationary internal structure and an external pod supported by a strut extending from an aircraft wing, an internal surface of said pod defining with the stationary internal structure an annular duct through which passes a bypass flow from the turbojet engine, said pod including a stationary portion and at least one fairing movable between a deployed position, wherein said bypass flow of said jet engine is reversed, and a stowed position, said thrust reverser further comprising:

a plurality of guides each connected to the stationary portion of the pod and slidably mounted to one of said fairings, the guides arranged to translate the fairing relative to said stationary portion of the pod to thereby define a clearance therebetween when in said deployed position, wherein at least two guides are supported by and positioned along opposed sides of the strut;

a plurality of drive devices each connected to the stationary portion of the pod and one of the guides, each drive device axially aligned along a central axis of each of said guides to linearly displace the at least one fairing between the deployed and stowed positions;

a plurality of vane cascades connected to said stationary structure and extending along a portion of said annular duct; and at least one flap pivotably connected to said stationary structure and arranged to pivot across said annular duct when said at least one fairing is in said deployed position to thereby obstruct the bypass flow in the annular duct and cooperate with said plurality of cascades to deflect said bypass flow through said clearance.

2. The thrust reverser as claimed in claim 1 wherein each of the guides includes an outer wall rigidly joined to the stationary portion of said pod and a cylinder rigidly joined at one end to one of said fairings, said cylinder being slidably in communication with said external wall and cooperating with one of said drive devices.

3. The thrust reverser as claimed in claim 2 wherein each of said drive devices includes a linear control actuator.

4. The thrust reverser as claimed in claim 3, wherein the linear control actuator includes a screw driven into rotation by a kinematics element and cooperating with an internal thread defined along said cylinder.

5. The thrust reverser as claimed in claim 4, wherein the screw is mounted at the end of a rod.

6. The thrust reverser as claimed in claim 4, further comprising a swivel nut positioned along the internal thread of the cylinder.

7. The thrust reverser as claimed in claim 3, wherein the linear control actuator includes a screw affixed to the cylinder and driven into rotation by a kinematics element.

8. The thrust reverser as claimed in claim 2, wherein the drive device includes a kinematics element driving a gear meshing with rack teeth defined along one side of the cylinder.

9. The thrust reverser as claimed in claim 1 further comprising a spacer positioned along said stationary structure substantially diametrically opposite to said strut, wherein at least two guides are supported by and positioned along the spacer and cooperate with the at least two guides connected to the strut to position the fairings into the deployed position.

* * * * *